United States Patent

Cordewener

[11] Patent Number: 5,816,742
[45] Date of Patent: Oct. 6, 1998

[54] PERMEABLE CONDUITS FOR DISBURSING FLUIDS

[76] Inventor: Charles H. Cordewener, 117 E. Louisa St. B 385, Seattle, Wash. 98102

[21] Appl. No.: 723,266

[22] Filed: Sep. 30, 1996

[51] Int. Cl.⁶ ............................. E02B 13/00; E02B 11/00
[52] U.S. Cl. .................................................. 405/43; 405/45
[58] Field of Search ............................. 405/43, 45, 36, 405/46–49; 239/542, 145, 547; 264/41, 45.3, 45.7; 138/DIG. 7

[56] References Cited

U.S. PATENT DOCUMENTS

| | | | |
|---|---|---|---|
| 901,582 | 10/1908 | Austin | 405/43 |
| 2,052,020 | 8/1936 | Black . | |
| 2,699,751 | 1/1955 | Hasler . | |
| 2,771,320 | 11/1956 | Korwin | 405/43 X |
| 2,798,768 | 7/1957 | Babin | 405/45 X |
| 2,860,600 | 11/1958 | Cheney . | |
| 3,103,789 | 9/1963 | McDuff et al. | 405/45 |
| 3,528,251 | 9/1970 | Falk | 405/43 |
| 4,056,344 | 11/1977 | Lemelson | 425/132 |
| 4,061,272 | 12/1977 | Winston | 239/145 |
| 4,110,420 | 8/1978 | Turner | 264/41 |
| 4,117,685 | 10/1978 | Skaife | 405/36 |
| 4,140,421 | 2/1979 | Lloyd | 405/43 |
| 4,168,799 | 9/1979 | Turner | 239/145 |
| 4,182,582 | 1/1980 | Youval | 405/45 |
| 4,221,501 | 9/1980 | Saburi | 405/37 |
| 4,517,316 | 5/1985 | Mason | 521/81 |
| 4,577,998 | 3/1986 | Dorn | 405/45 |
| 4,594,965 | 6/1986 | Asher . | |
| 4,615,642 | 10/1986 | Mason | 405/45 |
| 4,616,055 | 10/1986 | Mason | 524/381 |
| 4,626,130 | 12/1986 | Chapin | 405/43 X |
| 4,740,104 | 4/1988 | Stoehr | 405/43 |
| 4,904,112 | 2/1990 | McDonald | 405/45 |
| 4,928,427 | 5/1990 | Patterson | 47/58 |
| 4,931,236 | 6/1990 | Hettinga | 264/41 |
| 4,948,295 | 8/1990 | Pramsoler | 405/44 |
| 4,958,770 | 9/1990 | Mitchell | 239/145 |
| 5,141,360 | 8/1992 | Zeman | 405/43 |
| 5,152,634 | 10/1992 | Maso | 405/45 |
| 5,299,885 | 4/1994 | Prassas | 405/45 |
| 5,334,336 | 8/1994 | Franz | 264/45 |
| 5,417,997 | 5/1995 | Creed | 264/563 |
| 5,445,775 | 8/1995 | Prassas | 264/41 |
| 5,462,092 | 10/1995 | Franz | 138/177 |
| 5,474,398 | 12/1995 | Prassas | 405/45 |

FOREIGN PATENT DOCUMENTS

91/03155 3/1991 WIPO ..................................... 405/43

*Primary Examiner*—Dennis L. Taylor
*Attorney, Agent, or Firm*—Robert A. Jensen

[57] ABSTRACT

Integral conduits to disburse fluids along their length, fabricated out of two materials, and a method for manufacturing such structures with permeable wall parts; characterized by extruding a profile of thermoplastic material with a lengthwise extended slitted wall (10), and where this longitudinal slit is being outfitted with a permeable material consisting of one or more layers of fabric (12, 13, 13A, 13B, 14); the sides of the fabric strips being imbedded and sandwiched in the thermoplastic wall of the conduit, lengthwise along both sides of the slit; resulting in a hollow conduit with a lengthwise extended permeable wall section. Additionally, predetermined sections of the permeable fabric can be coated to block fluid emission from these selected sections (17, 19, 21). Fabrics of varying porosity are used to control emission of fluid. A longitudinal reinforcing element (23) may be captured within the structure (24) for securement purposes.

12 Claims, 3 Drawing Sheets

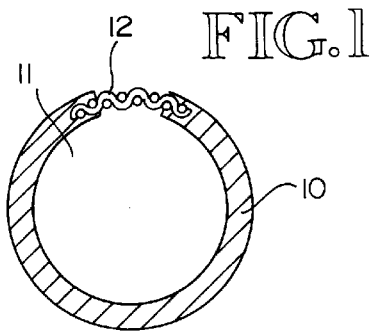
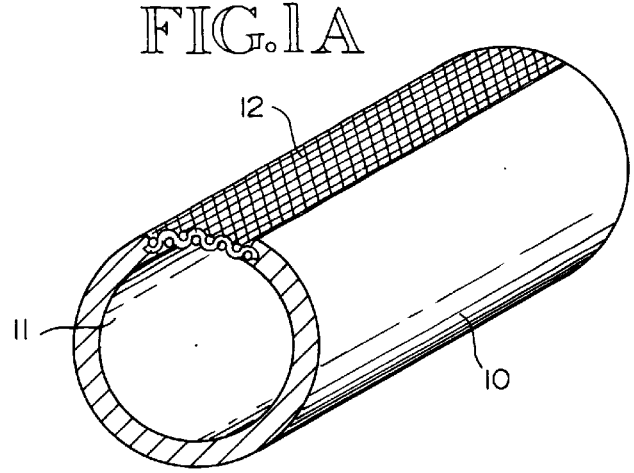
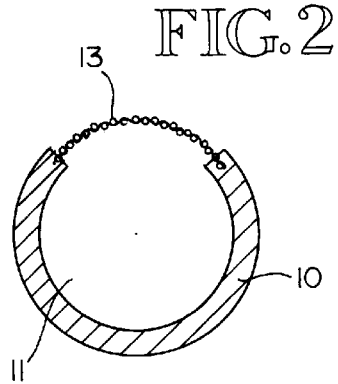
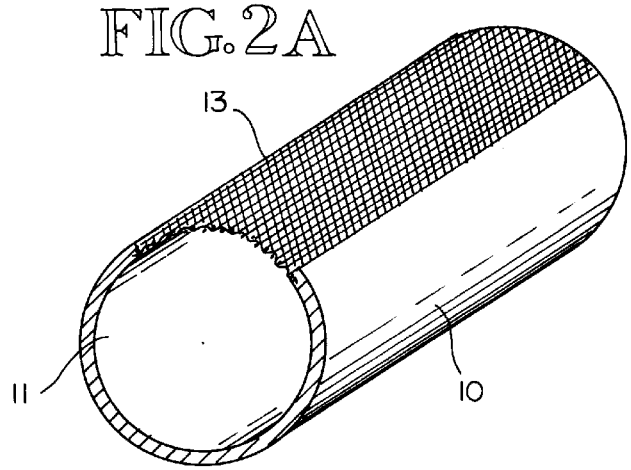
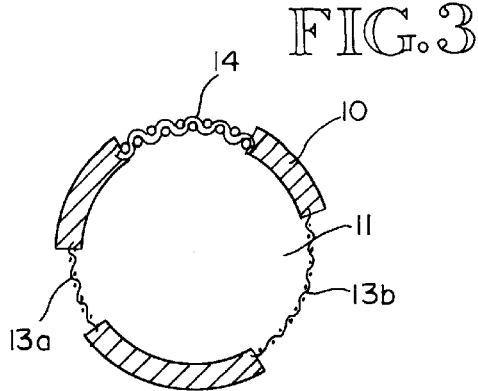
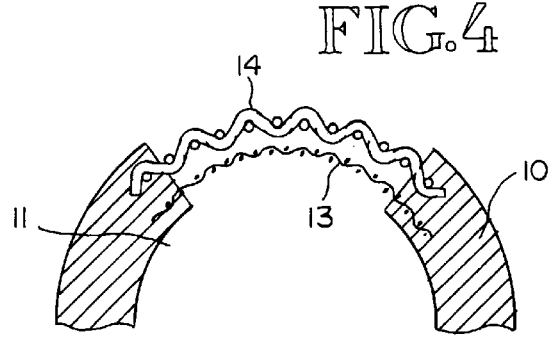

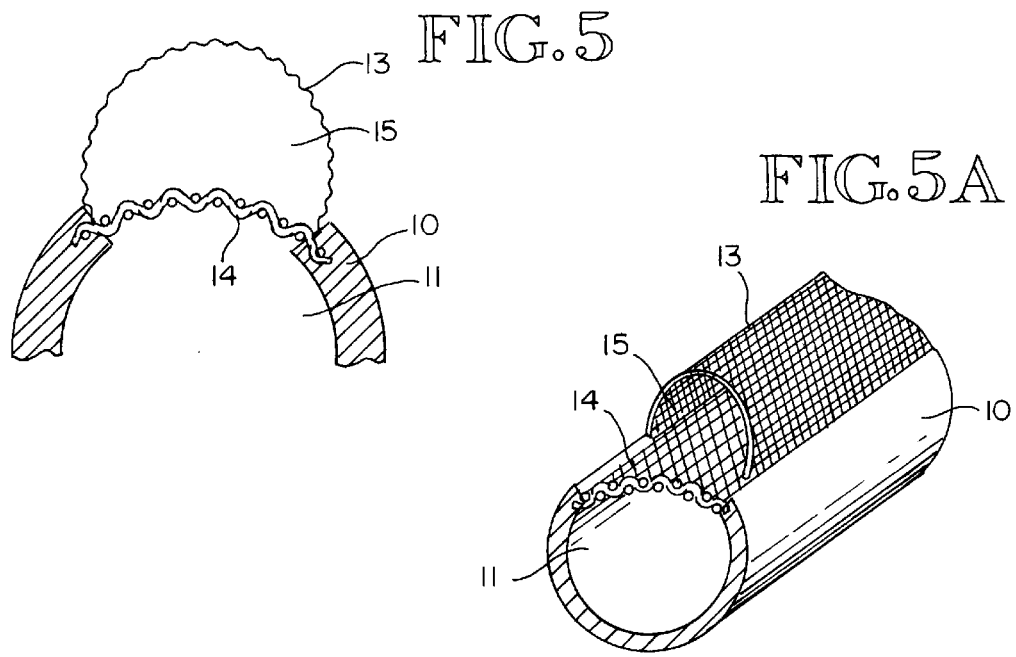
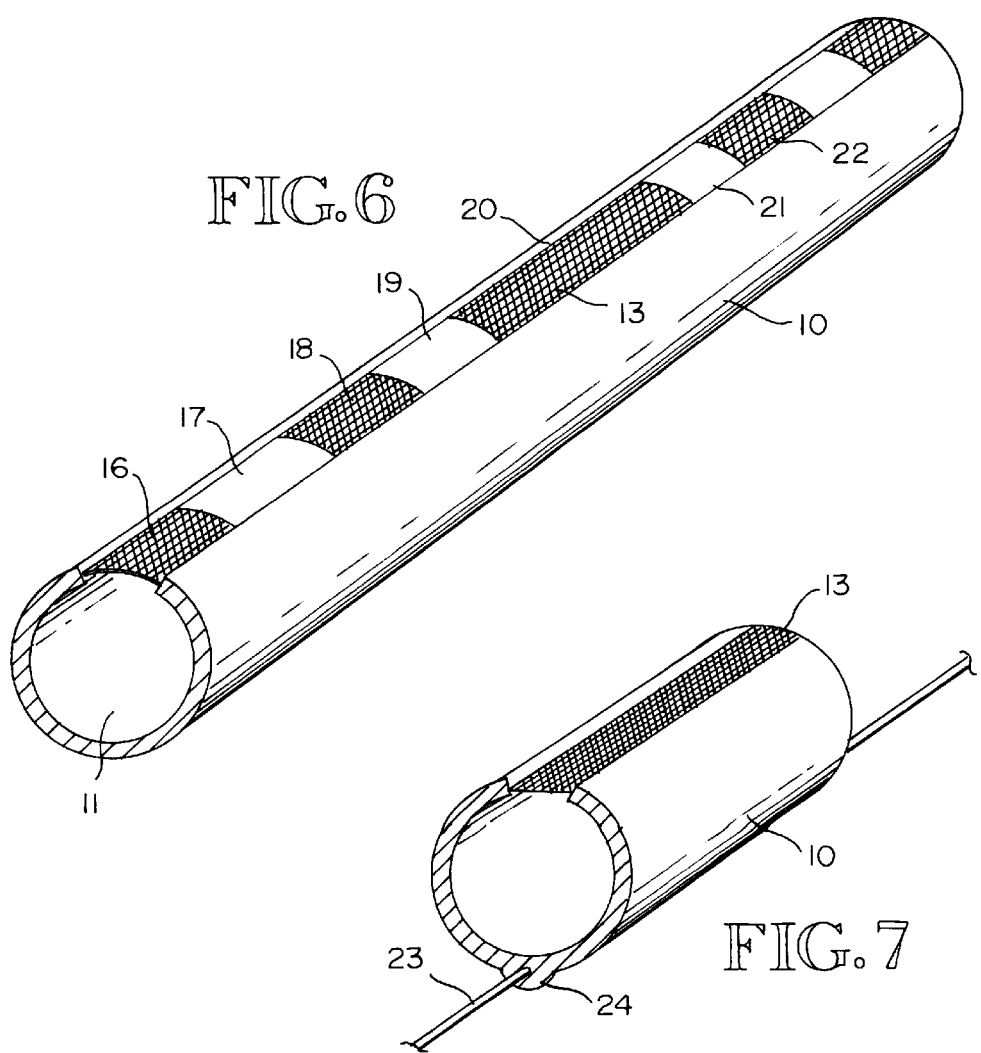

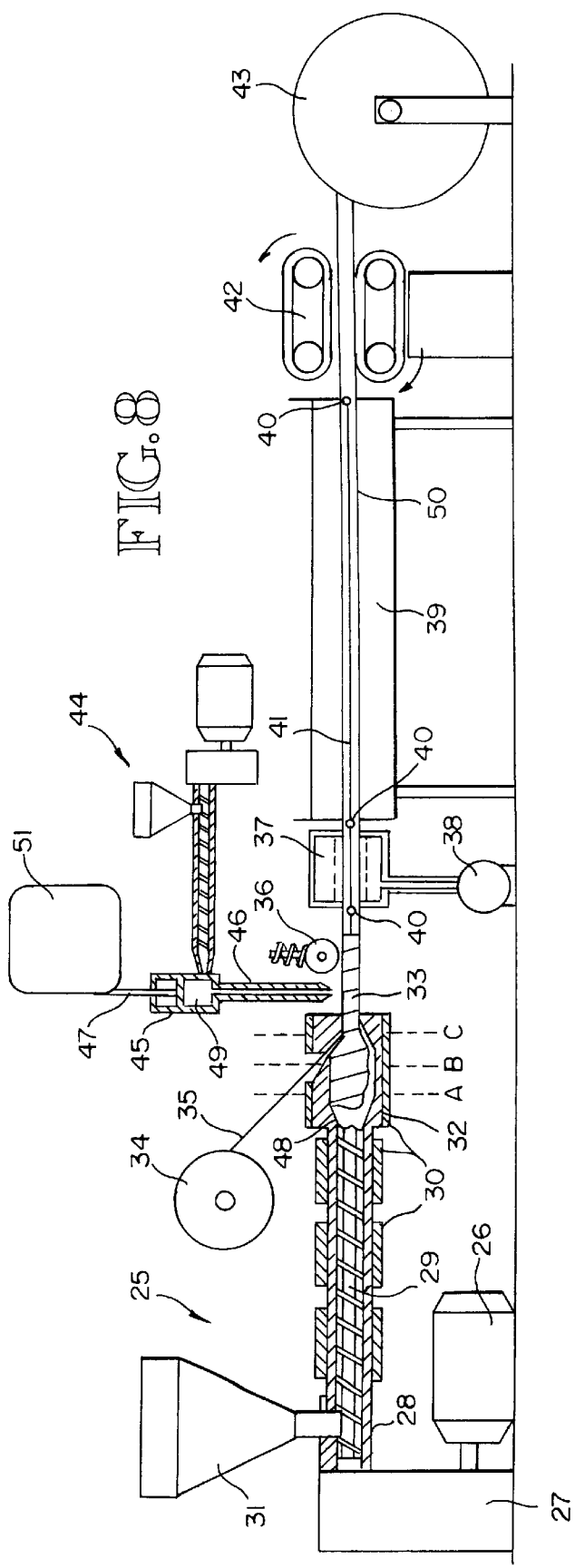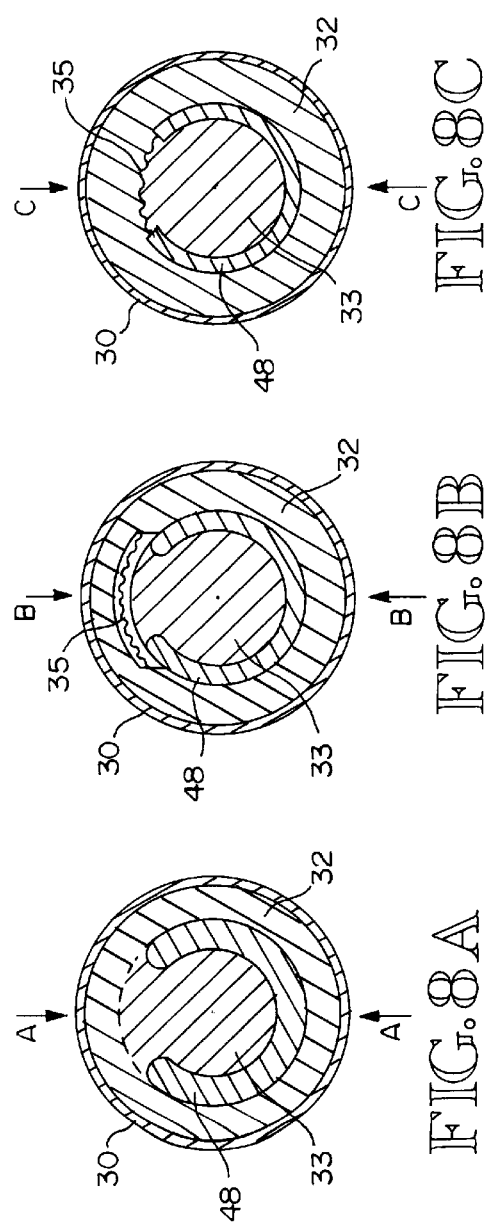
FIG. 8
FIG. 8A
FIG. 8B
FIG. 8C

PERMEABLE CONDUITS FOR DISBURSING FLUIDS

BACKGROUND OF THE INVENTION

The present invention relates to a variety of partial permeable conduits and other hollow structures to disburse fluids in controlled amounts in small to large volumes of porous or liquid matter, such as soils and water bodies, including a method to fabricate such permeable conduits.

BACKGROUND DESCRIPTION OF PRIOR ART

Considerable effort has been made to produce and use porous pipes for various applications, as appears from the sizable number of related patents. Many of these products are intended for irrigation, some as soaker hoses, other mainly for subsurface use. Some have been also proposed for the aeration of water, to enhance aquatic life or to treat waste water.

Irrigated agriculture worldwide is by far the largest consumer of fresh water, but the overall efficiency is low. Competition for diminishing fresh water resources compels the research and development of more efficient irrigation systems. Subsurface irrigation can eliminate most irrigation water losses due to evaporation and deep percolation inherent for nearly all now practiced systems. Greatly increasing the efficiency of the water, makes the same quantity available to a larger crop culture. Subsurface application of irrigation water, has also the ability to maintain a much more constant moisture content in the root zone—without blocking air exchange. Moisture stress can be fully eliminated—or, if desired, induced—thus promoting higher plant production and an ability to influence blooming.

However, due to existing shortcomings of the present available subsurface products, these have not been able to gain wide acceptance in the agri- and horticulture endeavours.

Several patents are based on extruded porous pipes consisting of combinations of elastomer particles dispersed in a thermoplastic resin, sometimes with additives to improve one or another property. Generally the elastomeric particles consist of crumb rubber originating from discarded tires, and polyethylene types are used as the thermoplastic binder.

Resulting porosity—when explained at all—is most often attributed to volatile matter, escaping from the hot extrudate, forming tortuous paths in the pipe-wall. Apart from certain distinctions in the manufacturing equipment to fabricate such pipes, the patent claims are divergent and even contradictory. They run from non-specified volatile matter and/or residual moisture (Turner U.S. Pat. Nos. 4,110,420 and 4,168,799), to seemingly controlled moisture levels, including a two-stage process (Mason U.S. Pat. Nos. 4,517,316 and 4,615,642). In contrast, another patent claims the use of essential moisture-free material to obtain uniform porous pipes (Mitchell, U.S. Pat. No. 4,958,770). In others patents claims for the use of blowing agents or moisture controlling additives to support and regulate the forming of pores are made (Hettinga, U.S. Pat. No. 4,931,236, Franz, U.S. Pat. Nos. 5,462,092 and 5,462,092).

More recently a patent is issued, where an extruded inner porous layer is reinforced with a spiral wound webbing, followed by a porous outer layer. Porosity of the first extrudate is increased by a pressurized fluid. Sizers are used to draw down the pipes after each extrusion (Creed, U.S. Pat. No. 5,417,997).

Various additives to improve processing and/or to obtain a smoother interior wall are claimed by Turner, Mason and Creed. Improved weatherability by adding UV-stabilizer is claimed by Prassas (U.S. Pat. Nos. 5,299,885, 5,445,775 and 5,474,398).

None of these various patents based on porous pipes made from crumb rubber-thermoplastic polymer combinations teaches how to obtain specific porosity, e.g., how to influence the pore sizes and pore size distribution. Mason (in U.S. Pat. Nos. 4,161,055 and 4,615,642) claims, that the porosity is influenced by changes in die temperature, and the rate of pull-off of the hot extrudate. In the earlier patent it is found that a lower die temperature results in a lower porosity. On the contrary, in the later patent it is mentioned, that a 20° F. decrease in die temperature increases porosity nearly three times! Such erratic results seem to emphasize, that more relevant factors influencing porosity have escaped attention.

There exist many factors that thwart the efforts to manufacture and replicate such porous pipe with a constant uniform porosity. The major component, rubber crumb, is generally obtained by grinding discarded tires. Car tires differ from manufacturer to manufacturer, in type and application, in age, exposure and wear. Tires are composed of various layers, each layer to accomplish a specific function. The grinding procedures, whether cryogenic or under ambient temperature, need high energy input. Much of the energy to shred rubber is transformed into heat. This causes fluctuations in the process operating temperatures, which, together with the wear of the cutting and impact tools affects the resulting particle shapes, size and particle size distribution. Screening of ground rubber is also not without its problems. The ability to produce identical batches of rubber crumb, with the same overall properties, has its limitations. Mixing the crumb rubber with the polyolefine pellets homogeneously, and then feeding this mix into the feed zone, e.g., screw channel of an extruder, without segregation, is the next hurdle. Apart from transport through the extruder and die, where other complications may appear, a porosity resulting from escaping gas is hard to control. An unknown portion of water vapour or other volatile matter may escape backwards through the screw channel and feed hopper, and is lost for causing porosity by evaporating from the extrudate. The hot extrudate is very fragile, due to the high elastomer-load, even very slight fluctuations in sizing or in pull-off speed or force, show consequences in porosity, as Mason shows also. These phenomenonna frustrate efforts to produce pipes with uniform and reproducible porosity. A two-stage process like Creed's (U.S. Pat. No. 5,417,997), which may enhance mechanical properties, compounds these problems.

Even thorough quality control of the raw materials, and monitoring every step of the operation, can not eliminate all inherent causes which foil the best intentions. Such non-reinforced pipes do not inherently have good mechanical properties. For a mechanical field installation, a relative substantial pipe wall thickness is mandatory to ensure the necessary tensile strength. Even so, impact strength of these pipes remains borderline. Stress cracking resistance remains a serious problem. The high particle load and erratic pore configuration which offers vulnerable points for attack, lower greatly the threshold for failure. Especially the locations were such pipes are stressed—pulled over and clamped on inserts—are highly vulnerable, and often show premature failure.

Obtaining just the right type of porosity for industrial applications, that is for long laterals, is a balancing act. Too porous an irrigation pipe, and the water may never reach the end of the line, or at least not in the desired quantity. Less porous, supplying water uniformly over the length of a longer pipe, dictates less or smaller pores. Consequently, this implies the demand for a higher than usual quality of irrigation water, to prevent clogging of small pores. Due to the expected, claimed, and demonstrated tortuous paths of the pores in the pipe-wall (see: Mason, U.S. Pat. No. 4,616,055, FIG. 9 and 10), filtration at least better than 20 micron is necessary to prevent blocking of most of the larger pores. It appears not practical, to try to protect smaller pores from becoming clogged by intensified filtration. The poorly uniform porosity, and the demand for high water quality, limit dramatically the marketability and acceptance of these types for industrial irrigation.

Another approach to obtain a porous irrigation pipe, using a blowing agent to foam a flexible PVC-pipe, and drawing down the hot extruded material to rupture the cell-walls to obtain an open-pored structure (Dorrn, U.S. Pat. No 4,577,998), suffers from similar problems as described earlier. These pipes, with an initial probably acceptable porosity, show a large and inadmissible drop in emission rate after running these only for a short period with water passed through a 100 micron filter. The products do not appear to be fitted for professional applications.

An interesting method to fabricate porous pipes proposes the use of a meltable polymer—such as polypropylene—and an only partly compatible fluid, which combination shows a certain immiscibility gap (Stöhr, U.S. Pat. No. 4,740,104). The melt is extruded into a spin bath to coagulate the mix into a pipe with a high pore cavity. The resulting pore sizes from this process however, are for the largest part less than 4 microns. This pore size puts extremely high demands on the filtration of any water to be applied, and is not economically feasible for irrigation.

Leaching of soluble particles dispersed in thermoplastic wall strips of a co-extruded pipe is another proposition (Youval, U.S. Pat. No. 4,182,582). Variations in porosity over the length of the pipe are obtained by increasing or decreasing the width of the relevant wall strips. The proposed method for the production of such pipes is cumbersome and includes four to five separate steps. The leaching process, essential to cause microporosity, demands several days, underlining that this proposition is highly unpractical, and not cost effective.

A complex and rather murky proposition embodies a seeping hosepipe with an integral textile core, embedded in a mixture of resin, an odd kind of plasticizer, carbon black, bactericides, fungicides, algicides and thickeners. This coating is claimed to show water absorbing capacity (Maso, U.S. Pat. No. 5,152,634). No information is provided how the pipe is made, nor how water is transferred through the pipe.

A system, based on ceramic elements, baked from clay mixed with plastic powders (Saburi, U.S. Pat. No. 4,221,501), demands many additional parts for installation and appears very labor intensive and expensive.

Coils of hollow cellulose acetate fibers are suggested to addresses the watering need of individual plants (Patterson, U.S. Pat. No. 4,928,427). Fibers are limited in their ability to carry water over any significant distance. Industrial applications based on coiled fiber seem hardly feasible.

An at least two compartmental extruded conduit, in cross section preferab like a figure eight with an open top, where the upper compartment is fill with a spongelike polyurethane foam, extending outside this compartment along the length of the conduit to provide capillary type action (Winston U.S. Pat. No. 4,061,272) has in principle more potential. Controlling the foaming operation and preventing accidental clogging of the lower, water supplying conduit will be a problem. Capillary type transport through this kind of barrier presumes small pores and therefore the need for protection against clogging, implying adequate water treatment.

A method whereby a perforated pipe is covered with fibrous material, and this configuration is confined in a second casing pipe, which, except for a lengthwise slit, encases the perforated pipe completely (Pramsoler, U.S. Pat. No. 4,948,295), may conclude this review of prior art. In this case water is supplied to the soil via the perforations and slit; the fibrous material serves to prevent soil particles and roots penetrating this pipe. Although this system shows conceptual merits, it does not offer any real practical advantages in comparison to its competitors. Producing such pipe is cumbersome, and has to be carried out in successive steps. The inner pipe has to be extruded, pulled through a cooling bath and mechanically provided with orifices. Next this pipe is wrapped with one or more layers of fibrous fleece, and then the casing pipe with slit needs to be extruded around this composition. Consequently, the final product will have a relative large wall thickness and limited flexibility, is costly in material and difficult to handle in longer dimensions. Subsurface mechanical installation seems highly impractical. This proposed system also does not provide for any control of the emission and emission rate over longer laterals, nor does it teach how to manipulate the various parameters to obtain a desired porosity.

None of the known porous pipes, including the above mentioned patented propositions, possess exactly defined and unequivocal uniform porosities, adaptability in porosity and design to accommodate existing conditions, together with an uncomplicated and flexible manufacturing process

SUMMARY OF THE INVENTION

This invention presents viable procedures for the manufacturing and application of a variety of irrigation and aeration conduits with pre-designed porosities, by incorporating one or more strips of prefabricated fabric materials in hereto reserved slits, in structures otherwise made of impervious flexible material. The elementary design consists of a lengthwise slitted thermoplastic pipe, in which the slit is bridged by a strip of fabric, and where the edges of the fabric are imbedded in the sidewalls along the slit. Varying the width of the slit and/or the using types of fabric with diverging permeabilities, allow an uncomplicated method to modify porosity and rate of emission, to meet the specific requirements for a given situation.

Usually, the porous products intended for irrigation or aeration, by nature of the manufacturing process, are porous over the entire surface, in circumference as well lengthwise. There exist no compelling reason for the pores to be distributed over the whole area of the pipewall. To obtain the same emission rate of a fluid or gas for a given length of pipe, under otherwise identical conditions, a smaller area with a proportionally higher pore density or larger pores can perform at least equally well. The option for larger pores concentrated on a smaller section of the wall is preferable, the main reason: lesser sensitivity for possible clogging.

An even better result can be expected, when pore size and pore form are fully controlled. Eliminating the small pores which are bound to clog, by utilizing materials of certified uniform pore sizes, provides the means for such control. Woven fabrics manufactured for screening and filtration purposes, are available in a broad variety of fiber and wire types, weave patterns, mesh openings and permeability. The basic manufacturing process consists of extruding an adequate thermoplastic profile and to encapsulate both edges of a fabric ribbon in the hot material, reserving a strip of fabric with the intrinsic uniform pore sizes and pore form free from thermoplastic material, in such a way the a partly permeable conduit results. After cooling in a water bath the product can be coiled.

Modifications on the basic principle are part of the invention. For aeration fine pored fabric is to be preferred, smaller gas bubbles dissolve better. This type of fabric may fail to contribute sufficient mechanical strength to the structure, the inclusion of an additional coarser, more rigid fabric can correct this problem.

Under certain conditions, a special design with a coarser fabric bridging the slit in the conduit to secure rigidity, with a tubular shaped finer pore size fabric extending over this permeable channel and outwards of the conduit, in such a way, that the edges of both the coarser and the finer fabric are imbedded in the sidewalls of the thermoplastic conduit. The function of the finer fabric is to prevent particles—such as silt—contaminating the conduit. On the other hand, to diminish the danger of clogging from the inside, the larger area of the finer fabric offers a larger filtering surface and space to form a substantial filter cake. Thus, the functioning of the pipe can be protected for extended periods.

Where trees or other plants are further apart, it can be advantageous to not supply water in the soil between the root zones. The invention does provide for the manufacture of conduits with intermittent permeable and impervious sections, by blocking corresponding permeable sections. The blocking is carried out during the primary process, no additional stage is involved.

It holds even for pipes with uniform porosity, that due to head loss the specific per unit length emission decreases. The rate of emission of fluids through a porous medium, keeping other parameters equal, is proportionate to the fluid's pressure. Head loss depends on flow rate and friction. Due to the high content of rubber particles, porous pipes made with this material show rougher walls and higher friction. Conduits of this invention have smooth walls, reducing friction loss. Nevertheless, pressure loss resulting from long conduits and high flow rates, may prohibit to obtain the pursued irrigation uniformity. Several measures to compensate fully for the drop in emission due to pressure loss are part of this invention.

Corrective measures can be made, by gradually increasing the permeable areas along the conduit from inlet to end. The same effect is obtained by partly blocking the permeable areas in a gradually tapering off pattern. Another method to accomplish uniform emission is, to use gradual more permeable fabrics for successive sections. Combining the control of the relative permeable areas and modifying the fabrics is also an option.

BRIEF DESCRIPTION OF THE DRAWINGS

For a fuller understanding of the nature, objects and method of the invention, reference is provided in the following detailed description. The specific embodiments represent, by way of examples only, modes of carrying out the invention as illustrated in the accompanying drawings, in which:

FIG. 1 is a cross sectional view of a permeable conduit of the subject invention.

FIG. 1A is a perspective view of the conduit with the permeable strip and the relation of the materials to each other.

FIG. 2 is a cross sectional view of a permeable conduit of the subject invention, with a wider strip of a fabric with finer pore openings.

FIG. 2A is a perspective view of the conduit of FIG. 2, with the wider permeable strip.

FIG. 3 is a cross sectional view of a conduit of the subject invention with an arrangement of multiple permeable strips.

FIG. 4 is a partial cross sectional view of a permeable conduit of the subject invention, in which a combination of a coarse fabric and a finer fabric form together the permeable part of the conduit.

FIG. 5 is a partial cross sectional view of a permeable conduit of the subject invention, in which the primary permeable conduit is formed with a relative large pored fabric, over which is superimposed a spacious extending partition formed out of a finer pored fabric.

FIG. 5A is a perspective view of the conduit of FIG. 5, with a partly cut away partition, to better show the structure and the relation of the parts.

FIG. 6 is a perspective view of a primary permeable conduit, where permeable sections have been selectively blocked.

FIG. 7 is a perspective view of an embodiment of a primary permeable conduit which includes a wire or cable encapsulated within a thicker portion of the impervious wall.

FIG. 8 is a schematic view of a system for producing the permeable conduits according to the invention.

FIGS. 8A, 8B and 8C are schematic successive downstream cross sections of an extrusion head to produce the permeable conduits according to the invention.

DETAILED DESCRIPTION OF THE INVENTION

The structures of the present invention consist only of two components—each with a specific function—which, integrally combined, form permeable conduits to distribute fluids along their length. Methods to accomplish this integration are also part of the invention.

The impervious part of the structure—intended for the fluids or gas transport, is preferably extruded from a thermoplastic material as a hollow tubular shape with a lengthwise slit. Although other thermoplastic materials can be used, low density polyethylene (LDPE) or linear low density polyethylene (LLDPE) types, having low melt indices (M.I.<1) and high stress cracking resistance are preferred. Such types are widely available at economical prices, uncomplicated to extrude, and possess satisfactory mechanical properties. These materials are also highly resistant to all conceivable environments and products with which the permeable pipes can be expected to become exposed. Pigmented with carbon black, to better protect against UV-degradation a long term functionality is assured in the preferred designs of this invention, the structures made out of LDPE or LLDPE are sufficient flexible to be coiled in a relative small diameter.

The second component, the permeable element of the structure, consist of a screen or permeable fabric as used for sifting and filtration, inserted in the lengthwise slit, to complete the structure.

The preference is to select a prefabricated woven material with uniform openings from the wide range of commercially available products. This selection offers choices in weave patterns, fibre or wire types and sizes, mesh openings, and open areas, that fit every imaginable application intended for this invention. For most applications synthetic fiber weaves are preferred, under some conditions woven metal wire can be used; glass fiber weaves are preferred where optimum resistance against chemical attack is needed. Natural fibers generally do not possess sufficient mechanical, chemical or biological resistance. The fabrics which deserve consideration, do not negatively affect the flexibility of the original thermoplastic structure, preserving the ability for coiling.

Referring to the drawings, FIG. 1 up to and including FIG. 7 illustrate different embodiments of the permeable structures invented. The common characteristics of these embodiments are the impervious thermoplastic wall and wall sections generally designated 10 and the hollow conduit through which the media to be distributed are transported 11.

FIGS. 1 and 1A illustrate a permeable conduit fitted with a relative small strip of coarse fabric with a relative large pore size 12. This embodiment is preferred, where there is no danger for clogging of the pores or conduit from the environment in which the structure is embedded. However, it allows the presence of larger particular impurities in the medium to be distributed. FIGS. 2 and 2A illustrate a permeable conduit fitted with a broader strip of a finer pored fabric 13 to prevent possible entry of fine particles from the environment into the structure. The finer pores require a higher quality pretreatment of the medium to be distributed with regard to solid impurities.

FIG. 3 illustrates a conduit fitted with multiple permeable strips, the strips 13A and 13B of the same pore size differing in width, while strip 14 is larger pored Although of no direct practical importance, it shows the wide versatility of possible combinations.

FIG. 4 embodies a configuration where a combination of two types of fabric is of advantage.

The fine fabric 13 prevents entry of particles from the environment into the structure, and/or for example assures the distribution of fine gas bubbles, while the coarse fabric or screen 14 improves the mechanical integrity of the structure.

FIG. 5 illustrates a variation on the embodiment of FIG. 4. Here the screen or fabric 14 serves to stabilize the structure, but allows expected impurities contained in the medium to pass. The fine pored fabric 13 spaciously extending over the lengthwise slit bridged by fabric 14, forms a partition 15, superimposed on the main structure. This permeable partition 15 has a twofold function. Primarily this conduit acts as a barrier to prevent the entry of particles from the environment which surrounds the structure. Secondly this fine fabric 13 will retain all particles in the medium which are too large to pass through the pores. The generous filter surface and ample space 15, allow for the accumulation of a considerable filter cake, before any real problem of clogging arises. The operative lifespan of the conduits under frequently encountered unfavourable conditions can be vastly expanded, and can be successfully used, where other existing system do not offer a feasible option.

FIG. 6 illustrates by way of one example only, another variation of the invention, a permeable structure in which sections of the permeable strip have been blocked, to prevent emission in these segments. The lengths of successive open and blocked segments can be selected subject to conditions. In this illustration, permeable segments 16, 18 and 22 have identical lengths, but segment 20 is longer; the blocked segments 17, 19 and 21 each differ in length. There are several ways to accomplish the blocking, polymer solutions or dispersions like paints, glues, printing inks, hot melts or other hydrocarbon derivates can be used. The preferred method however is, to apply strips of thermoplastic melt over the permeable fabric, before sizing and cooling of the structure. Application is preferably carried out by activating an accumulator, which is supplied with molten LDPE or LLDPE by a small extruder. The accumulator is operated by a hydraulic system and computer controlled. To clearly mark the segments, the blocking material is preferably of a color contrasting with the impervious wall material.

FIG. 7 illustrates art embodiment where for purposes of attaching the structure to keep them in the desired position, a cable or wire 23 is incorporated in a wall thickening 24.

FIG. 8 is a schematic view of a system to produce the structures of the invention. A extruder 25 is outfitted with a motor 26, to drive an extrusion screw 29 in a barrel 28 via a gearbox 27. Temperatures over the barrel 28 and an extrusion head 32 are regulated by heating and cooling elements 30. A thermoplastic material is supplied via a hopper 31. A mandrel 33, disposed in the head 32 as part of the die assembly shaping the extrudate, is partly extended from said head. The thermoplastic material, transported and molten by the screw action, is forced downstream the die around the mandrel on its way outside, preferably in cross section as an incomplete annulus. A reel 34 contains a ribbon of fabric 35, said ribbon is led through a channel, which merges near the downstream end of the head with the die channel around the mandrel 33. Where the channels join, the fabric ribbon 35 is on both sides partly enveloped with molten thermoplastic material 48, before the thus formed structure emerges from the extrusion head 32. Further downstream, to correct potential minor imperfections in the sandwiching of the fabric in the thermoplast extrudate, and to smooth possible bumps resulting from the application of blocking strips, the structure—still supported by the extended mandrel 33×is passed under a roll with adjustable pressing force 36. The structure is then pulled through a vacuum sizer 37, evacuated by pump 38. To obtain and maintain the desired degree of vacuum during sizing, and to prohibit cooling water being sucked upstream through the permeable structure, two stainless steel balls 40, kept mandrel 33, perform as seals. Belt puller 42 pulls the structure 50 through the sizer 37 and cooling bath 39. The cooling water is constantly refreshed to keep the water temperature low. To seal off, and squeeze out any water picked up from the cooling bath, a third ball 40 is kept in position inside structure 50 at the end of the bath, by an extension of cable 41, used for the other two sealing balls 40. After leaving puller 42, the now finished integral conduit, is wound on a reel with the help of coiler 43.

A second small extruder 44 processes the thermoplastic material used to block segments of the permeable fabric. Extruder 44 is outfitted with motor, gearbox, barrel and screw, hopper and heating and cooling elements. The plastic melt is extruded into an accumulator 45, furnished with a nozzle 46, positioned between head 32 and pressing roll 36, directly over the slit outfitted with fabric 35. On demand plunger 47 is activated, and an exact quantity of melt 49 is forced from the nozzle and superimposed on the fabric to seal the pores. The to and fro movement of plunger 47 in accumulator 45 is realized and controlled by an assembly 51, consisting of a hydraulic unit commanded by a programmable computer. FIGS. 8A, 8B and 8C illustrate schematically successive downstream cross sections of extrusion head 32.

SUMMARY

Thus the reader will see, that the permeable conduits of this invention provide devices, with which distribution of fluids along their length can be completely controlled. These conduits can be fabricated in a considerable range of products of varying pore sizes and varying pore area, allowing for a very large flexibility in managing emission rates. Because of the extremely high precision in the manufacture of woven fabrics, these materials provide the basis for these conduits to be fabricated with optimum values for the manufacturer's coefficients of variation. This fact, together with the possibility to influence porosity to obtain uniform emission along even very long laterals, allow for high design uniformity for subsurface irrigation systems, as specified in ASAE Engineering Practice ASAE EP405. The ability to use only slightly treated waste water subsurface, eliminating the danger of contact with humans or animals, contributes to solving some environmental problems and can save fresh water. The use of fine pored fabrics, allow to aerate shallow water bodies, without losing input for reason of the escape of larger gas bubbles at the surface. The ability for long conduits, coupled with low emission rates, makes it feasible, to disburse substances in water bodies, which influence the movement of migrating fish and to protect them from danger.

The availability of fabrics, based on a variety of fibers made from synthetic polymers, glass, carbon, metal and other, allow the manufacturing of special permeable conduits, resistant to chemical or biological active solutions for leaching and bio-remediation of soils, ores, slag or other porous materials.

The invention has been described and illustrated as an embodiment of permeable structures, mainly for subsurface irrigation and aeration of water bodies. It is not intended to be limited to the described applications, nor to the described and illustrated method of producing said structures. Manufacturing of the conduits of this invention can for example be carried out by using flat extruded material; or; strips of thermoplastic material may be heated up and then paired with the fabric.

Since various modifications and structural changes of these embodiments and method of production may be made, without departing in any way from the spirit of the present invention, the scope of this invention should be determined by the appended claims and their legal equivalents, rather than by the examples given.

I claim:

1. An integral conduit, fabricated of at least two materials for distributing fluid along its length, comprising:
   a main body portion of a flexible durable impervious thermoplastic material including at least one continuous longitudinal opening extending the length thereof; said longitudinal opening varies in width along said length;
   at least one secondary body portion fixedly secured in the said longitudinal opening of said main body portion;
   said secondary body portion securely fixed in said longitudinal opening is selected from the group consisting of flexible durable permeable woven fabrics and wire cloths, variable in pore sizes and pore shapes;
   said secondary body portions securely fixed in said longitudinal opening along the length of said conduit vary in permeability by selecting said secondary body portions with increasing and with decreasing pore sizes, and with variations in pore shape;
   said secondary body portions are secured in said main body portion by sandwiching the border parts of said secondary body portions in said main body portion along the said continuous longitudinal opening extending the length of said main body portion;
   whereby said integral conduit is characterized in being capable of both conducting and disbursing predetermined amounts of fluid simultaneously in a predetermined pattern along the entire length of said conduit.

2. The integral conduit of claim 1 wherein:
the main body portion of said conduit is selected from the group of thermoplastic polymers consisting of low, medium and linear low density polyethylene with high stress cracking resistance;
the secondary body portions of said conduit are selected from the group consisting of synthetic and inorganic woven fabrics and wire cloths, with pore sizes varying from approximately 1 micron to 2,500 micron.

3. The integral conduit of claim 1 wherein:
the secondary body portion comprises a plurality of stratified layers of woven fabrics and wire cloth.

4. The integral conduit of claim 1 wherein:
predetermined sections of the secondary body portion are blocked by a durable impervious material.

5. An integral conduit as in claim 1 wherein:
at least two secondary body portions are fixedly secured in the longitudinal opening of said integral conduit;
   the first said secondary body portion is disposed to form an approximately tubular cross sectional shape with the impervious main body portion;
   the next said secondary body portion is disposed to form a permeable partition parallel to, and projecting over the said first secondary body portion;
   the pore size of said first secondary body portion is large as to let solid impurities of predetermined particle sizes, contained in the fluids to be disbursed, pass;
   the pore size for said next secondary body portion forming said partition is significantly smaller;
   whereby said partition provides a reservoir to cache said solid impurities and permits fluid to pass through said partition, but prevents entrance of solid particles of predetermined sizes from outside of said partition, expanding the applicability for the use with contaminated fluids, while extending the functionality of said integrated conduit over a substantially longer periods.

6. The integral conduit of claim 5 wherein:
predetermined sections of the secondary body portions are blocked by a durable impervious material.

7. The integral conduit as in claim 1 wherein:
a cable or wire is incorporated in the main body portion of flexible durable impervious thermoplastic material for attaching said integral conduit to supports.

8. An integral conduit as in claims wherein:

said integral conduit as a single and as a plurality is arranged and employed to provide an integral means to disburse fluids.

9. A integral conduit as in claim 8 wherein:

said integral conduit as a single and as a plurality is arranged and employed to provide an integral means to disburse fluids for irrigation.

10. An integral conduit as in claim 8 wherein:

said integral conduit as a single and as a plurality is arranged and employed to provide an integral means to disburse fluids for aeration of liquid and porous materials.

11. An integral conduit as in claim 8 wherein:

said integral conduit as a single and as a plurality is arranged and employed to provide an integral means to disburse fluids for reclamation, leaching and bio-remediation.

12. An integral conduit as in claim 8 wherein:

said integral conduit as a single and as a plurality is arranged and employed to provide an integral means to influence the behavior of fish and the direction in which they move, by disbursing substances effecting the eyesight, and substances effecting olfactory sensory system of the fish.

\* \* \* \* \*